(12) United States Patent
Rafray et al.

(10) Patent No.: US 8,663,812 B2
(45) Date of Patent: Mar. 4, 2014

(54) METHOD FOR PREPARING A CELLULAR MATERIAL BASED ON HOLLOW METAL BEADS

(75) Inventors: Alain Rafray, Le Plessis Robinson (FR); Nicolas Auffray, Paris (FR); Régis Bouchet, Jouy (FR); Pierre Josso, Erquy (FR); Jérôme Lozat, Domessin (FR); Vincent Marcadon, Orsay (FR)

(73) Assignee: ONERA (Office National d'Etudes et de Recherche Aerospatiales), Chatillon (FR)

( * ) Notice: Subject to any disclaimer, the term of this patent is extended or adjusted under 35 U.S.C. 154(b) by 205 days.

(21) Appl. No.: 12/993,065

(22) PCT Filed: May 14, 2009

(86) PCT No.: PCT/FR2009/000563
§ 371 (c)(1),
(2), (4) Date: Mar. 28, 2011

(87) PCT Pub. No.: WO2009/150314
PCT Pub. Date: Dec. 17, 2009

(65) Prior Publication Data
US 2011/0171483 A1    Jul. 14, 2011

(30) Foreign Application Priority Data
May 16, 2008    (FR) ...................... 08 02658

(51) Int. Cl.
*B21F 27/08*    (2006.01)
*B22F 5/10*    (2006.01)
*B32B 3/26*    (2006.01)
*B32B 5/16*    (2006.01)

(52) U.S. Cl.
USPC ............ 428/608; 428/613; 428/313.9; 245/4; 140/3 A

(58) Field of Classification Search
USPC ........................ 428/613, 608; 140/3 A; 245/4
See application file for complete search history.

(56) References Cited

U.S. PATENT DOCUMENTS 485,074 A * 10/1892 Winship ............................ 245/9
689,232 A * 12/1901 Schoch ............................ 63/37

(Continued)

FOREIGN PATENT DOCUMENTS

FR        2585445       *  1/1987
JP        2002-360320   * 12/2002

(Continued)

OTHER PUBLICATIONS

International Search Report completed Jun. 23, 2010 and mailed Jul. 5, 2010 from corresponding International Application No. PCT/FR2009/000563, filed May 14, 2009 (3 pages).

(Continued)

*Primary Examiner* — John J Zimmerman
(74) *Attorney, Agent, or Firm* — Klein, O'Neill & Singh, LLP

(57) ABSTRACT

Method, apparatus, and system for preparing a cellular material based on hollow metal beads. According to the description, at least one bead chain in which said hollow metal beads are linked to one another in pairs by means of an articulation is used as elementary structure constituting the cellular material.

17 Claims, 1 Drawing Sheet

(56) References Cited

U.S. PATENT DOCUMENTS

| | | | |
|---|---|---|---|
| 763,736 A * | 6/1904 | Doppenschmitt | 245/1 |
| 1,087,876 A | 2/1914 | Goodridge et al. | |
| 1,479,402 A * | 1/1924 | Soltesz | 152/201 |
| 1,992,856 A * | 2/1935 | Blatz | 139/420 R |
| 2,119,436 A * | 5/1938 | Lauff | 63/4 |
| 2,945,390 A * | 7/1960 | Bush et al. | 474/248 |
| 3,135,044 A * | 6/1964 | Mote, Jr et al. | 29/423 |
| 3,259,151 A * | 7/1966 | Schmitz | 139/425 R |
| 3,521,518 A * | 7/1970 | Cohen | 84/402 |
| 3,762,026 A * | 10/1973 | Shapiro | 419/1 |
| 4,582,534 A | 4/1986 | Torobin | |
| 4,867,931 A * | 9/1989 | Cochran, Jr. | 264/9 |
| 5,073,459 A * | 12/1991 | Smarsly et al. | 428/550 |
| 5,225,123 A * | 7/1993 | Torobin | 264/43 |
| 5,564,535 A * | 10/1996 | Kanianthra | 188/371 |
| 6,023,946 A * | 2/2000 | Magi | 63/9 |
| 6,908,065 B1 * | 6/2005 | Ritchie | 245/1 |
| 2005/0260398 A1 * | 11/2005 | Owens | 428/304.4 |
| 2007/0243069 A1 * | 10/2007 | Read | 416/229 R |
| 2009/0183488 A1 * | 7/2009 | Namiki et al. | 59/2 |
| 2009/0194136 A1 * | 8/2009 | Yamashiro et al. | 134/8 |

FOREIGN PATENT DOCUMENTS

| | | | |
|---|---|---|---|
| JP | 2009-121599 | * | 6/2009 |
| WO | WO 88/09416 | * | 12/1988 |
| WO | WO 2005/061208 | | 7/2005 |

OTHER PUBLICATIONS

English translation of the Written Opinion completed Jun. 23, 2010 and mailed Jul. 5, 2010 from corresponding International Application No. PCT/FR2009/000563, filed May 14, 2009 (8 pages).

* cited by examiner

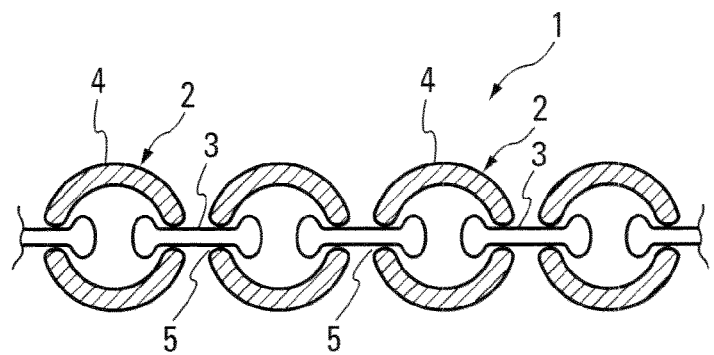
Fig. 1
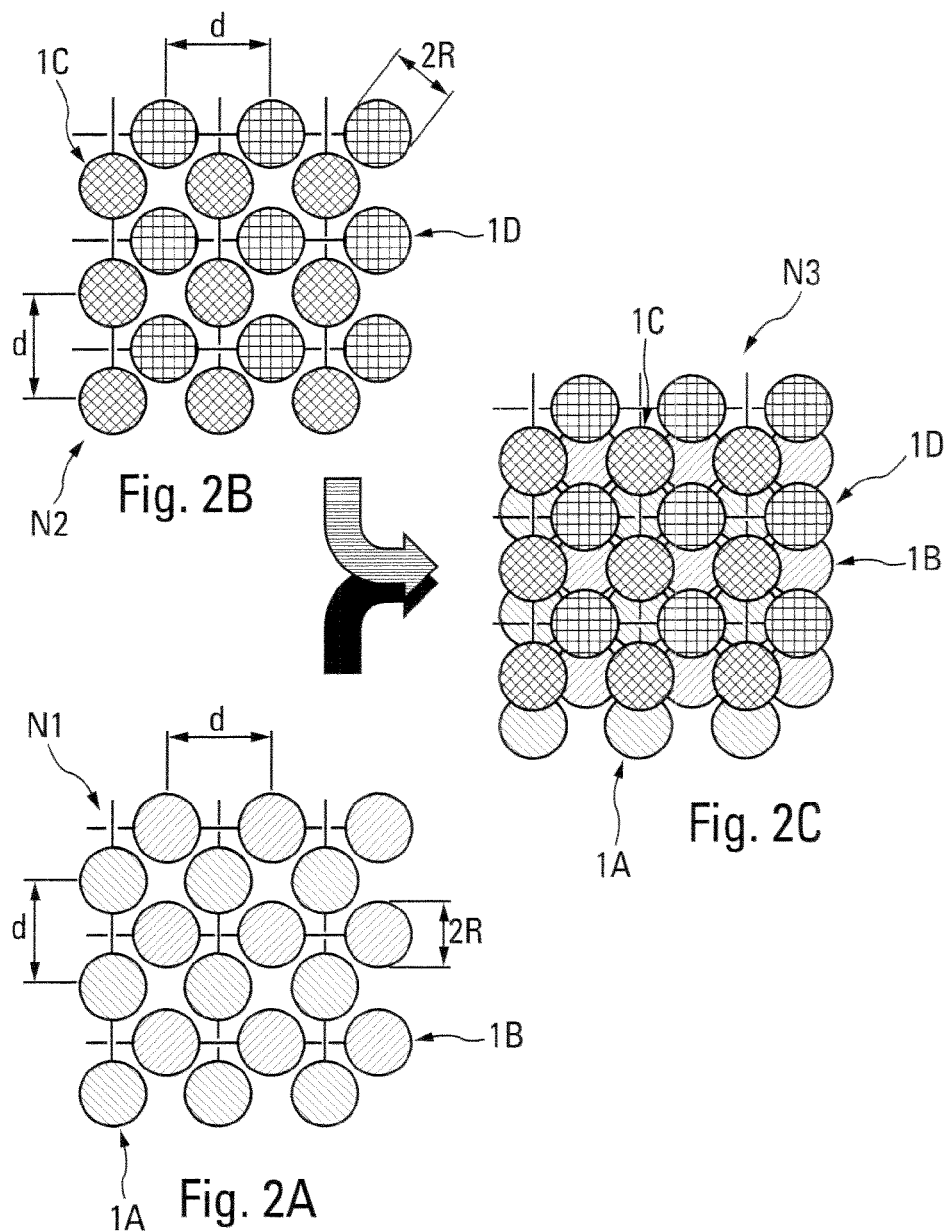
Fig. 2B
Fig. 2C
Fig. 2A

METHOD FOR PREPARING A CELLULAR MATERIAL BASED ON HOLLOW METAL BEADS

CROSS-REFERENCE TO RELATED APPLICATION(S)

This is a national phase application under 35 U.S.C. §371 of PCT Application No. PCT/FR2009/000563, filed May 14, 2009, which claims priority to French Application No. 08/02658, filed May 16, 2008, the contents of each of the foregoing are expressly incorporated herein by reference.

FIELD OF ART

The present invention relates to a method for making a plastically deformable cellular material based on hollow metal balls, as well as such a plastically deformable cellular material.

BACKGROUND

Plastically deformable materials based on hollow metal balls are already known. Such materials are currently in demand for their numerous physical properties (robustness, light weight, impact resistance, etc.). Therefore, they are used in multiple applications, including in mechanical energy absorption devices (such as set forth in the article "Modelling of MHS cellular solid in large strains" published in International Journal of Mechanical Sciences Vol. 48 (2006) p. 1273-1286 or also in the article "Uniaxial Elasto-Plastic Behaviour of Adhesively Bonded Hollow Spheres Structures (HSS): Numerical Simulations and Experiments" in volumes 539-543 of Materials Science Forum (2007) p. 1874-1879). Such devices are for example used in the field of aeronautic, naval, automotive building, etc.

In FR 2,585,445 a method is more specifically described for making a cellular material item in the form of a compact arrangement of hollow metal balls. To this end, an appropriate amount of hollow metal balls is introduced into a mould having the shape of the desired item, then the balls are made integral in contact together.

Furthermore, FR 2,615,787 describes a method for manufacturing items made of a cellular material based on webs of hollow metal balls. According to such a method, ball webs are arranged in a mould so as to match the shape thereof. As soon as the mould is loaded with ball webs, the contacted balls are fastened to each other.

Thus, implementing the methods known from FR 2,585,455 and FR 2,615,787 absolutely requires using a mould for accommodating either balls, or ball webs.

Obviously, using even a mould is restricting, since it is required to manufacture it, and generally to remove it after the desired item has been obtained. In addition, only full cellular material items can be obtained through such known methods, since manufacturing hollow or recessed items cannot be contemplated or only with great difficulty.

SUMMARY

The present invention aims at overcoming such drawbacks.

To this end, according to the invention, the method for making a plastically deformable cellular material based on hollow metal balls, being able to absorb mechanical energy, is remarkable in that, as an elementary constitutive structure of the cellular material, at least one ball chain is used, wherein said hollow metal balls are connected by pairs to each other through a joint.

Thus, such a ball chain makes it easier to handle hollow metal balls upon making the ball cellular material of this invention.

Indeed, by means of such a ball arrangement, it is more specifically possible to:

wind said ball chain around the lateral surface of an item acting as a mandrel. Such winding allows, more particularly, to cover with the cellular material based on hollow metal balls of this invention items with both a developable or an undevelopable shape (such items being able to be kept or, on the contrary, to be removed from the desired cellular material items);

arrange said ball chain into a mould. Thus when several ball chains are for example used, they can be shaped into the mould shape arranging them randomly or in an orderly way in the latter. Such a mould could be either part of the desired cellular material item or removed from the latter;

intertwine a plurality of such ball chains together or, alternatively, with links (for example, metallic or synthetic ones), so as to form ball webs able, more specifically, to resist to impact and drilling. Moreover, in order to obtain higher thickness webs, it could be contemplated for example:

superimposing several lower thickness ball webs ones on top of the others, subsequently assembling them together (for example, through soldering, gluing, etc . . . ). In each ball web, the distance between the centres of two adjacent balls of a ball chain could be equal to $4\sqrt{2}/\sqrt{3}$ times the radius of a ball;

preparing a three dimension weaving of the ball chains, according to a known method in the field of textile applications. Moreover, the thus prepared ball webs with lower or larger thicknesses could, for example, be wound around the lateral surface of items;

etc.

In addition, whatever the way the ball chain(s) has or have been used (winding, moulding, weaving, etc.), said balls can advantageously be punctually fastened in mutual contact, so as to obtain, for example, an at least partially rigid cellular material based on balls.

Furthermore, it results from the foregoing that the present invention further relates to a plastically deformable cellular material able to absorb mechanical energy, said material being made up of hollow metal balls. According to the invention, the material is remarkable in that said hollow metal balls are connected by pairs together through a joint, like a ball chain.

Preferably, according to the invention, said joint could be a dumbbell-shaped link.

Thus, the cellular material of this invention has a high mechanical energy absorption ability should it be impacted and compressed. Indeed, since the balls are as many cells able to be plastically deformed and thus to dissipate the energy absorbed by said material, the deformation thereof allows the cellular material to accept very high deformations, while keeping a reasonable level of constraints inside it. Moreover, the hollow balls significantly reduce the weight of the cellular material and impart it a high porosity.

It should be noticed that it is known from WO 2005/061208 to use carbon, graphite or polymer solid ball collars to be removed therefrom so as to form a porous material made up of a matrix comprising voids of predefined positions. Such voids are obtained from the so-called solid pearls being arranged within the matrix and subsequently destroyed upon the porous material manufacturing process. Thus, such a porous material does not comprise individual cells able to be plastically deformed under a constraint (as the voids of such a porous material are unable, as a result of their own nature, to be plastically deformed). On the other hand, the hollow metal balls of the material of the present invention form as many individual cells able to be deformed under a constraint (including through the shell thereof) and able to absorb mechanical energy.

According to another characteristic of the present invention, the cellular material based on hollow metal balls could be made up of at least two such mutually connected ball chains.

The thus connected ball chains could be so via the ends thereof or as well, alternatively, at any location, so as to form a more or less complex and regular network of ball chains.

It is to be noticed that the connections between ball chains could be performed while implementing chemical, physico-chemical, mechanical methods, etc.

Furthermore, when the cellular material of this invention is formed from several chains of hollow metal balls, the balls could show either identical (ball size, ball shape, material, etc.), or different characteristics so as to obtain a cellular material with heterogeneous structural properties.

In addition, according to the invention, within a single ball chain, the balls could have either identical (size, shape, material, etc.) or different characteristics.

It is to be noticed that the ball based cellular material of the present invention could be contained (whether the balls are integral between them or not), for example in a partitioned structure.

Moreover, the optional additional punctual connections between adjacent balls result from additional assembling methods (of the soldering, welding, gluing, type, etc.).

The figures of the appended drawing will better explain how this invention can be implemented. On these figures, identical reference numerals relate to similar components.

BRIEF DESCRIPTION OF THE FIGURES

FIG. 1 schematically and partially shows, in a cross-sectional view, a chain with hollow metal balls, able to be used for forming the ball based cellular material of this invention, wherein the connection between two adjacent balls is a joint.

FIGS. 2A, 2B and 2C show the manufacture of ball webs according to the present invention.

DETAILED DESCRIPTION

As shown on FIG. 1, the ball chain 1 able to be used in implementing this invention comprises hollow metal balls 2 (for example, made in a stamped metal sheet) of a spherical shape. Each ball 2 is connected to the adjacent ball 2 by means of a joint 3 (for example, a dumbbell-shaped link). The joints 3 are hinged on the shells 4 of the balls 2, at holes 5 arranged to this end.

First Exemplary Embodiment According to this Invention

Herein, ball chains 1 are used (such as shown on FIG. 1) made of nickel-plated brass (comprising 30% zinc). The diameter of the hollow metal balls 2 is approximately 2 mm and the thickness of the shell 4 thereof is close to 240 µm.

In order to form a cylindrical peg made of a cellular material based on hollow metal balls, the ball chains 1 are first arranged randomly in a cylindrical alumina mould, with an inner diameter of 34 mm and a height of 60 mm. The balls 2 are then fastened to each other by means of an eutectic copper-silver solder. After the ball chains 1 have been removed from the mould, a cylindrical peg is obtained, made in a cellular material with a diameter of 33.5 mm and a height of 40 mm.

Such a peg could be implemented in an adaptive structure being able to both keep its integrity when being very little deformed under low constraints and to absorb high deformations under high constraints.

Second Exemplary Embodiment According to this Invention

In the present example, ball chains 1 are used, similar to those implemented in the first example, as well as a CuZn36 brass extruded tube having an inner diameter of 32 mm, an external diameter of 34 mm and a height of 40 mm.

In order to manufacture a cylindrical piece partially consisting in a cellular material based on hollow metal balls, the extruded tube is merely filled with ball chains 1 arranging them randomly in the latter.

It should be noticed that no assembly (through soldering, gluing, etc.) of the ball chains 1, between themselves or with the extruded tube, is here prepared (the ball chains 1 remaining thus free to move inside the tube), although such an assembly would enable to significantly increase the amount of energy being dissipated by the cellular material tube while being crushed.

Third Exemplary Embodiment According to this Invention

Herein, a single chain 1 with hollow balls is used, with a length of 100 m so as to cover, with the ball based cellular material of this invention, the external surface of a turbo-engine casing with a diameter of 15 cm and a length of 25 cm. The hollow balls 2, with a diameter of 3.6 mm, are made of 316L type stainless steel. The adjacent balls in contact would be either assembled therebetween or not, for example, through welding.

To this end, the single ball chain 1 is first wound, on several layers, around the turbo-engine casing. The thus wound ball chain 1 is then contained with stainless steel (of the 316L type) plates, the assembly (chains and plates) being optionally welded so as to impart unity to the structure.

The thus built protective layer of a ball based cellular material has more specifically as a function to contain the blades of the turbo-engine upon breaking of the structure, for mean temperature applications (for example up to 600° C.).

Fourth Exemplary Embodiment According to this Invention

In the present example, aluminium alloy (of the AU4G type) ball chains 1 are used for developing a web of ball based cellular material, the diameter of the hollow metal balls 2 being 1 mm.

To this end, ball chains 1 are regularly intertwined in a web comprising KEVLAR (trademark) threads so as to build a ball web. This step is repeated several times. Then, an assembly of ball webs is achieved, that are to be superimposed on each other, so as to obtain a web of hollow metal balls with a thickness of 15 mm.

The thus obtained web (similar to a fabric) has, on the one hand, very good tension properties thanks to the KEVLAR threads and, on the other hand, very good projectile impact absorption properties thanks to the chains 1 with hollow metal balls. It is more specifically adapted for light armouring applications (for example, for fit out bulletproof jackets).

Fifth Exemplary Embodiment According to this Invention

In the present example, being illustrated by FIGS. 2A, 2B and 2C, chains are used with hollow metal balls 1A, 1B, 1C and 1D (similar to that illustrated on FIG. 1), wherein, on the one hand, the balls all have the same radius R and, on the other hand, the distance d between the centres of two adjacent balls of a chain is equal to $4\sqrt{2}/\sqrt{3}$ times said radius R. The balls of the ball chains 1A to 1D could be made in 316L stainless steel.

As shown on FIG. 2A, a plurality of ball chains 1A is intertwined with a plurality of ball chains 1B so as to form a web N1. In the web N1, the ball chains 1A are arranged as a well (or a chain, which may be referred to as a warp), whereas the ball chains 1B are arranged as a chain, also referred to as a warp, (or a weft). Moreover, in such a web N1, each ball of a ball chain 1A (or 1B) is arranged at the centre of four balls belonging to adjacent ball chains 1B (or 1A).

Similarly to what has just been described for the web N1, a web N2 is made, similar to the latter, with the chains 1C and 1D (see FIG. 2B).

Subsequently, as illustrated on FIG. 2C, the webs N1 and N2 are superimposed so that a ball of the web N1 (or N2) is arranged at the centre of four balls of the web N2 (or N1). Then, a composite web N3 is obtained, being able to be made rigid, for example, through welding or sintering.

Obviously, by stacking several webs N1 and N2 as described above, centred cubic structures could be achieved.

Those skilled in the art will understand that by appropriately defining the ball chains (diameter of the balls and distance between two adjacent balls), selecting the type of weaving and superimposing different webs, it is possible to develop other ball based structures according to this invention.

For example, by appropriately varying the ball diameter and the distance between balls of two successive webs, regular stacks can be easily prepared, of a bent shape so as to coat turbo-engine casings.

It is further to be noticed that the ball based cellular material of the present invention can also be implemented for manufacturing architecture materials for multifunctional applications with a structural emphasis: mechanical behavior, shock absorption and temperature holding, etc.

The invention claimed is:

1. A method for preparing a plastically deformable cellular material based on hollow metal ball chains comprising a plurality of hollow metal balls forming plastically deformable cells able to absorb mechanical energy, said method comprising:
    forming a first ball web comprising warps comprising said hollow metal ball chains and wefts comprising said hollow metal ball chains;
    forming a second ball web having warps comprising said hollow metal ball chains and wefts comprising said hollow metal ball chains;
    superimposing said first ball web and said second ball web to form a composite web in which a ball of one of said first and second ball webs contacts four balls of the other of said first and second ball webs.

2. The method according to claim 1, wherein said composite web is arranged in a mould.

3. The method according to claim 1, wherein the balls of the first ball web have a same size and a distance between two adjacent ball centers equals to $4\sqrt{2}\sqrt{3}$ times the radius of a ball.

4. The method according to claim 1, wherein the balls of the first ball web are punctually fastened to the balls of the second ball web.

5. A plastically deformable cellular material made from hollow metal ball chains and able to absorb mechanical energy, wherein said material is a composite web comprising a first ball web formed by a first plurality of interwoven ball chains superimposed with a second ball web formed by a second plurality of interwoven ball chains; wherein warps and wefts of the first ball web and of the second ball web comprise said hollow metal ball chains ball chains.

6. The material of claim 5, wherein a plurality of balls of the first plurality of interwoven ball chains are connected by pairs to each other with a joint.

7. The material of claim 6, wherein said joint is a dumbbell-shaped link.

8. The material of claim 5, wherein the cellular material is located in a mould.

9. The material of claim 5, further comprising a jacket having the superimposed first plurality of interwoven ball chains and second plurality of interwoven ball chains forming a layer thereof.

10. The material of claim 5, wherein at least one ball of the first and second plurality of interwoven ball chains is made from nickel-plated brass, CuZn36, 316 SS, or an aluminium alloy.

11. The material of claim 5, wherein the superimposed first plurality of interwoven ball chains and second plurality of interwoven ball chains is intertwined in a web comprising para-aramid synthetic fiber threads.

12. A system of plastically deformable cellular material made of hollow metal ball chains and able to absorb mechanical energy, said system comprising:
    a composite web comprising a first ball web formed by warps comprising said ball chains and wefts comprising said ball chains superimposed with a second ball web formed by warps comprising said ball chains and wefts comprising said ball chains; wherein the superimposition causes a ball of one of said first and second ball webs to contact with four balls of the other of said first and second ball webs; and wherein at least some of the plurality of balls are connected by pairs with each other.

13. The system of claim 12, wherein at least one ball of the first and second plurality of ball chains is made from nickel-plated brass, CuZn36, 316 SS, or an aluminium alloy.

14. The system of claim 12, wherein the superimposed first ball web and second ball web is intertwined in a web comprising para-aramid synthetic fiber threads.

15. The system of claim 12, further comprising a protective layer lined with the superimposed first ball web and second ball web.

16. The system of claim 12, further comprising a jacket lined with the superimposed first ball web and second ball web.

17. The system of claim 12, wherein at least some of balls of the superimposed first ball web and second ball web are rigidly fixed to adjacent balls.

* * * * *